United States Patent
Reidt (10) Patent No.: US 9,615,432 B2
(45) Date of Patent: Apr. 4, 2017

(54) MULTICOLOR SIGNAL ARRANGEMENT, METHOD FOR DEFINING OPERATING MODES OF A MULTICOLOR SIGNAL ARRANGEMENT, AND SYSTEM HAVING A MULTICOLOR SIGNAL ARRANGEMENT AND AN RFID TRANSMITTING DEVICE

(71) Applicant: EATON ELECTRICAL IP GMBH & CO. KG, Schoenefeld (DE)

(72) Inventor: Georg Reidt, Swisttal (DE)

(73) Assignee: EATON ELECTRICAL IP GMBH & CO. KG, Schoenefeld (DE)

(*) Notice: Subject to any disclaimer, the term of this patent is extended or adjusted under 35 U.S.C. 154(b) by 0 days.

(21) Appl. No.: 15/033,906

(22) PCT Filed: Nov. 3, 2014

(86) PCT No.: PCT/EP2014/073602
§ 371 (c)(1),
(2) Date: May 3, 2016

(87) PCT Pub. No.: WO2015/067566
PCT Pub. Date: May 14, 2015

(65) Prior Publication Data
US 2016/0278185 A1 Sep. 22, 2016

(30) Foreign Application Priority Data
Nov. 5, 2013 (DE) .................... 10 2013 112 127

(51) Int. Cl.
*H05B 37/02* (2006.01)
*H05B 33/08* (2006.01)
*H04B 5/00* (2006.01)

(52) U.S. Cl.
CPC ....... *H05B 37/0227* (2013.01); *H04B 5/0031* (2013.01); *H04B 5/0062* (2013.01);
(Continued)

(58) Field of Classification Search
CPC .................... H05B 33/0803; H05B 33/0857
(Continued)

(56) References Cited

U.S. PATENT DOCUMENTS 5,924,784 A * 7/1999 Chliwnyj ............... F21S 9/02
307/64
6,016,038 A 1/2000 Mueller et al.
(Continued)

FOREIGN PATENT DOCUMENTS

DE 202005006465 U1 6/2005
DE 102004007057 A1 9/2005
(Continued)

*Primary Examiner* — Thuy Vinh Tran
(74) *Attorney, Agent, or Firm* — Leydig, Voit & Mayer, Ltd.

(57) ABSTRACT

A multicolor signal arrangement has a multicolor LED, a microcontroller, and an input interface, the arrangement being configured such that the input interface receives pulse width-modulated control signals. The multicolor LED is operated in a first operating mode when the input interface receives a first control signal, and the multicolor LED is operated in a second operating mode when the input interface receives a second control signal. The multicolor signal arrangement has an RFID device, and the multicolor signal arrangement is configured such that the RFID device receives operating mode definition information, the operating mode definition information is transmitted to the microcontroller, and the microcontroller defines the operating modes dependent on the operating mode definition information. The invention further relates to a method for defining operating modes of such a multicolor signal arrangement and to a system having such a multicolor signal arrangement and an RFID transmission device.

13 Claims, 4 Drawing Sheets

(52) U.S. Cl.
CPC ..... *H05B 33/0815* (2013.01); *H05B 33/0854* (2013.01); *H05B 33/0872* (2013.01); *Y02B 20/346* (2013.01)

(58) Field of Classification Search
USPC .................................................. 315/292, 308
See application file for complete search history.

(56) References Cited

U.S. PATENT DOCUMENTS

| | | | |
|---|---|---|---|
| 9,332,611 | B2 | 5/2016 | Reidt |
| 2002/0038157 | A1 | 3/2002 | Dowling et al. |
| 2002/0048169 | A1 | 4/2002 | Dowling et al. |
| 2002/0126020 | A1 | 9/2002 | Wang et al. |
| 2002/0145394 | A1 | 10/2002 | Morgan et al. |
| 2003/0020595 | A1 | 1/2003 | Wacyk |
| 2003/0112148 | A1 | 6/2003 | Belliveau |
| 2004/0032226 | A1 | 2/2004 | Lys |
| 2005/0248299 | A1 | 11/2005 | Chemel et al. |
| 2007/0153514 | A1 | 7/2007 | Dowling et al. |
| 2007/0268151 | A1 | 11/2007 | Juen et al. |
| 2008/0100224 | A1 | 5/2008 | Felder et al. |
| 2009/0112366 | A1 | 4/2009 | Jahn et al. |
| 2010/0001703 | A1* | 1/2010 | Williams ............ H02M 3/1584 323/283 |
| 2010/0109897 | A1 | 5/2010 | Hohler |
| 2012/0326633 | A1 | 12/2012 | Enenkel |

FOREIGN PATENT DOCUMENTS

| | | |
|---|---|---|
| DE | 102004039677 A1 | 12/2005 |
| DE | 102004061294 A1 | 6/2006 |
| DE | 60207218 T2 | 7/2006 |
| DE | 102006015175 B4 | 10/2007 |
| DE | 102007025126 A1 | 12/2008 |
| DE | 102007052377 A1 | 5/2009 |
| DE | 102010005907 A1 | 7/2011 |
| DE | 102011080595 A1 | 2/2013 |
| EP | 0433527 B1 | 6/1991 |
| EP | 1016062 B1 | 7/2000 |
| EP | 1224845 B1 | 7/2002 |
| EP | 1234140 B1 | 8/2002 |
| EP | 1295515 B1 | 3/2003 |
| EP | 1337784 B1 | 8/2003 |
| EP | 1388276 B1 | 2/2004 |
| EP | 1428415 B1 | 6/2004 |
| EP | 1459600 A2 | 9/2004 |
| EP | 1502483 B1 | 2/2005 |
| EP | 1535495 B1 | 6/2005 |
| EP | 1624728 B1 | 2/2006 |
| EP | 1687692 B1 | 8/2006 |
| EP | 1887836 B1 | 2/2008 |
| EP | 2139299 B1 | 12/2009 |
| EP | 1393599 B1 | 5/2010 |
| EP | 1422975 B9 | 3/2011 |
| EP | 2364067 B1 | 9/2011 |
| EP | 2603055 A1 | 6/2013 |

* cited by examiner

MULTICOLOR SIGNAL ARRANGEMENT, METHOD FOR DEFINING OPERATING MODES OF A MULTICOLOR SIGNAL ARRANGEMENT, AND SYSTEM HAVING A MULTICOLOR SIGNAL ARRANGEMENT AND AN RFID TRANSMITTING DEVICE

CROSS-REFERENCE TO RELATED APPLICATIONS

This application is a U.S. national stage application under 35 U.S.C. §371 of International Application No. PCT/EP2014/073602, filed on Nov. 3, 2014, and claims benefit to German Patent Application No. DE 10 2013 112 127.6, filed on Nov. 5, 2013. The International Application was published in German on May 14, 2015, as WO 2015/067566 A1 under PCT Article 21(2).

FIELD

The invention is based on a multicolor signal arrangement.

BACKGROUND

Multicolor signal arrangements are generally known. For example, a multicolor signal arrangement is known from EP 2 603 055 A1. In conventional multicolor signal arrangements, however, the drawback is that the operating modes have to be defined as early as during the manufacture of the multicolor signal arrangement and cannot be defined or modified further at a later date, and so the operating modes can no longer be adapted to the needs or requirements during subsequent use. Therefore, there is an urgent need to still be able to define the operating modes even at a later date.

SUMMARY

An aspect of the invention provides a multicolor signal arrangement, comprising: a multicolor LED; a microcontroller device; an input interface; and an RFID device, wherein the multicolor signal arrangement is configured such that the input interface receives one or more pulse-width-modulated control signals, wherein the multicolor LED is operated in a first operating mode when the input interface receives a first control signal, wherein the multicolor LED is operated in a second operating mode when the input interface receives a second control signal, wherein the multicolor signal arrangement is configured such that the RFID device receives operating mode definition information, wherein the operating mode definition information is transmitted to the microcontroller device, and wherein the microcontroller device defines the operating modes based on the operating mode definition information.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the present invention provides a multicolor signal arrangement that does not have the drawbacks of the art and the operating modes of which can in particular still be defined even at a later date.

According to an aspect of the invention the multicolor signal arrangement comprises an RFID device, the multicolor signal arrangement being designed such that the RFID device receives the operating mode definition information, the operating mode definition information is transmitted to the microcontroller device, and the microcontroller device defines the operating modes on the basis of the operating mode definition information.

The multicolor signal arrangement according to the invention is advantageous over the prior art in that the operating modes of the multicolor signal arrangement can still be defined even at a later date, i.e. in particular following production of the multicolor signal arrangement. This advantageously makes it possible to flexibly adapt the operating modes of the multicolor signal arrangement to the desired or required use and to still be able to modify the operating modes even at a later date. The operating modes can, for example, be defined in the factory once the multicolor signal arrangement has been produced, before the multicolor signal arrangement is delivered to the user. To do so, the multicolor signal arrangement is identified and the operating modes are defined according to the desires of the user, for example by an RFID transmission device or an RFID recorder that sends the operating mode definition information to the RFID unit. However, the operating modes can, for example, also be defined for the first time with the user. For example, the user himself can define the operating modes using an RFID recorder. The operating modes can be defined once. The operating modes can, however, also be defined multiple times. For example, the operating modes can thus be modified or redefined.

The RFID (radio frequency identification) technology per se is known from the prior art. However, it has surprisingly been found that the RFID device is advantageously able to receive operating mode definition information, to transmit said information to the microcontroller device, and to thereby allow the operating modes to be defined by the microcontroller device. Furthermore, the RFID device is an extremely efficient option for processing the operating mode definition information and relaying it to a microcontroller device. The RFID device is also economical in terms of energy consumption, and so no additional energy source has to be provided in order to define the operating modes. It is sufficient if the energy for the RFID device can be provided by an RFID transmitter unit, for example.

In particular, the RFID device can be in the form of an NFC (near field communication) device, for example. This advantageously makes it possible to use a smartphone or a mobile phone having an NFC interface to transmit the operating mode definition information to the RFID device or NFC device.

The multicolor signal arrangement receives pulse-width-modulated control signals at an input interface of, for example, smart switchgear. In the process, the controllers can be programmable logic controllers (PLC). In principle, the pulse-width-modulated control signals can take any form that can be produced using pulse-width modulation.

Pulse-width-modulated control signals having respective signal lengths of 100 ms, 200 ms, 300 ms up to 1000 ms are mentioned here purely by way of example. By dividing up said signals, ten different control signals can be sent, for example, up to a maximum length of 1000 ms (corresponding to a fundamental frequency of 1 Hz). A further control signal can, for example, be the zero signal or off signal, by which the multicolor signal arrangement or the multicolor LED is switched off. For example, the voltage and/or the current can be used as the transmission variable for the control signals. The advantage of pulse-width-modulated control signals is that a single 24 VDC digital control output of a PLC can be used for example to be able to activate the multicolor signal arrangement. This makes it possible to connect the multicolor signal arrangement to, for example, a PLC or even to smart switchgear in a particularly efficient manner. There is no need for an additional bus connection or other data connection.

It should be noted that the terms "first" and "second" do not describe a chronological sequence. These terms are merely used to distinguish between various control signals or operating modes. The first control signal is different from the second control signal. The first operating mode is assigned to the first control signal and the second operating mode is assigned to the second control signal. However, the multicolor signal arrangement or the input interface is not restricted to receiving just two control signals. Three, four, five or more control signals can also be received.

When the input interface receives the first control signal, the multicolor LED is operated in the first operating mode or the microcontroller device operates the multicolor LED in the first operating mode, and so a blinking red light is produced, for example. When the input interface receives the second control signal, the multicolor LED is operated in the second operating mode or the microcontroller device operates the multicolor LED in the second operating mode, and so a continuous yellow light is produced, for example. When the input interface receives a third control signal, the multicolor LED can be operated in a third operating mode; when the input interface receives a fourth control signal, the multicolor LED can be operated in a fourth operating mode, etc. The multicolor signal arrangement is not restricted to two operating modes; the multicolor LED can also be operated in three, four, five or more operating modes. If, for example, the input interface receives six control signals or is designed to receive six control signals, the multicolor LED can be operated in six different operating modes.

The operating modes specify the manner in which the multicolor LED is operated. The operating modes can have different colors, different light patterns and/or different special effects. The colors are those colors that the multicolor LED can produce. Red, green, blue and yellow are mentioned here merely by way of example. In principle, however, all other colors are also possible. The different light patterns indicate the manner in which the multicolor LED is operated over time. Continuous light, blinking light, pulsed light and/or other special effects are mentioned here merely by way of example. For example, blinking light means that the multicolor LED is alternately illuminated and switched off. The illumination time, i.e. the time for which the multicolor LED is illuminated, and the off time, i.e. the time for which the multicolor LED is switched off, can be the same length. In pulsed light the multicolor LEDs may, for example, briefly illuminate multiple times one after the other, followed by a longer pause or off time. In principle, the special effects can be any manner of special effect that can be activated by the multicolor LED over time using different colors. For example, special effects can be understood to be combinations or time variations of blinking light, pulsed light and/or light intensity that changes over time and/or alternating colors.

One single operating mode can, for example, be composed of a color and a light pattern. If for example the color red and the light pattern "blinking light" are predefined, the operating mode "blinking red light" can be defined for example. If for example the color yellow and the light pattern "continuous light" are predefined, the operating mode "continuous yellow light" can be defined for example. Defining the operating modes should be taken to mean, for example, that the color and/or the light pattern is predefined within the operating mode definition information and is transmitted to the RFID device. For example, the predefined color and/or the predefined light pattern is then assigned to the operating mode by the microcontroller device and stored. When the control signal assigned to this operating mode is received, the predefined color and/or the predefined light pattern can be fetched by the microcontroller device so that the multicolor LED is operated in this operating mode with the predefined color and/or the predefined light pattern.

Advantageous embodiments and example developments of the invention can be derived from the sub-claims and from the description below with reference to the drawings.

According to an example development, the operating mode definition information includes color information. The color information contains, for example, the color red, green or blue. The color information indicates, for example, the color by which the operating mode is supposed to be defined or the color in which the multicolor LED is operated when the corresponding operating mode is used. The color information can also include a plurality of colors, and so one operating mode can for example be defined by a plurality of colors. In order to define a plurality of operating modes, the color information can also include one or more colors for each individual operating mode.

According to another example development, the operating mode definition information includes light pattern information. The light pattern information can for example include the information "blinking light" and/or "pulsed light". For example, the light pattern information indicates the time sequence pattern in which the multicolor LED is activated. The light pattern information can for example include one or more light patterns for one operating mode. However, in order to define a plurality of operating modes, the light pattern information can also include one or more light patterns for each operating mode.

According to another embodiment, the multicolor signal arrangement is designed such that predefined light patterns, colors and/or special effects are stored in the microcontroller device, the operating mode definition information including assignment information, the microcontroller device assigning a stored light pattern, a stored color and/or a stored special effect to the assignment information, the microcontroller device defining the operating mode by the assigned light pattern, the assigned color and/or the assigned special effect.

The assignment information can be assigned to the stored light pattern, the stored color and/or the stored special effect by means of a look-up table, for example.

By means of this embodiment, light patterns, colors or special effects, which may even be very complex, can be predefined as early as during the manufacture of the multicolor signal arrangement, for example. As a result, default settings can for example be predefined at the factory. The microcontroller device comprises a memory in which predefined light patterns, colors and/or special effects can be stored. These stored light patterns, colors and/or special effects can be fetched and assigned to the operating modes. In the assignment information, it is possible for example to communicate which operating mode is to be defined by which light pattern, which color and/or which special effect.

According to another embodiment, the operating mode definition information includes a dataset, the dataset including operating mode identification information, color information, light pattern information and/or assignment information. The operating mode definition information can include one or more datasets. The operating mode identification information is used to identify the operating mode that is to be defined. In this way, the operating mode identification information can for example contain the number of the operating mode. In addition to the operating mode identification information, the dataset contains color information, light pattern information and/or assignment information. As a result, it is unambiguously described which operating mode is to be defined by which color, which light pattern and/or which special effect. The dataset can contain the operating mode identification information and one or two pieces of information or all the information from the group of color information, light pattern information and assignment information.

According to another embodiment, the operating modes can be defined and/or modified multiple times by means of the RFID device. If for example an operating mode has already been defined once, it is possible to redefine the operating mode. It is thus possible to merely modify the operating mode or completely redefine it. For example, it is thus possible to only change the color of the operating mode, yet it is also possible to change the entire operating mode, for example from a blinking yellow light to a continuous red light.

According to another embodiment, the multicolor signal arrangement is designed such that the RFID device additionally receives, i.e. in addition to the operating mode definition information, control signal definition information, the RFID device sending the control signal definition information to the microcontroller device and the control signals being defined and/or modified on the basis of the control signal definition information. This means that the control signals assigned to the operating modes can still be defined or modified by means of the RFID device even at a later date. If for example the control signal having the pulse width 500 ms is or was assigned to operating mode no. 5, the control signal can be modified by means of the RFID device, and so for example a control signal having the pulse width 800 ms can be assigned to said operating mode no. 5. The control signals can also be defined once or multiple times. The signals can be defined for example in the factory once the multicolor signal arrangement has been manufactured, but can also be defined with the user or by the user. As a result, it is advantageously possible to flexibly adapt the control signals to the requirements of the user.

According to another embodiment, the RFID device is in the form of a microchip. The formation as a microchip allows for a particularly compact design. As a result, the multicolor signal arrangement can be implemented using a particularly small installation space. In addition, the RFID device can for example be connected to the microcontroller device by means of an I2C (Inter-Integrated circuit) interface. However, an SPI (serial peripheral interface) and/or a UART (universal asynchronous receiver transmitter) interface could also be used, for example. Furthermore, the RFID device and the microcontroller device can be arranged on a common printed circuit board in a common housing. This allows the multicolor signal arrangement to be implemented in a particularly efficient and compact manner.

The present invention also relates to a method for defining operating modes of a multicolor signal arrangement comprising a multicolor LED, a microcontroller device and an input interface, the input interface receiving pulse-width-modulated control signals, the multicolor LED being operated in a first operating mode when the input interface receives a first control signal, the multicolor LED being operated in a second operating mode when the input interface receives a second control signal, the multicolor signal arrangement comprising an RFID device, the RFID device receiving operating mode definition information, the operating mode definition information being transmitted to the microcontroller device and the microcontroller device defining the operating modes on the basis of the operating mode definition information.

Reference is also made to the embodiments regarding the multicolor signal arrangement. In terms of embodiments, reference is also made to the above examples. The situations set out therein also apply to this method.

The present invention also relates to a system comprising a multicolor signal arrangement as described above and an RFID transmission device, the RFID transmission device being designed such that it sends the operating mode definition information to the RFID device.

The RFID transmission device can for example be a conventional RFID recorder. However, it could also be a smartphone or the like, for example. Reference is also made to the embodiments regarding the multicolor signal arrangement. In terms of embodiments, reference is also made to the above examples. The situations set out therein also apply to this system.

Embodiments of the present invention are shown in the drawings and are explained in more detail in the following description.

In the various figures, like parts are always provided with like reference numerals and thus are also each generally only introduced or mentioned once.

Figure 1:
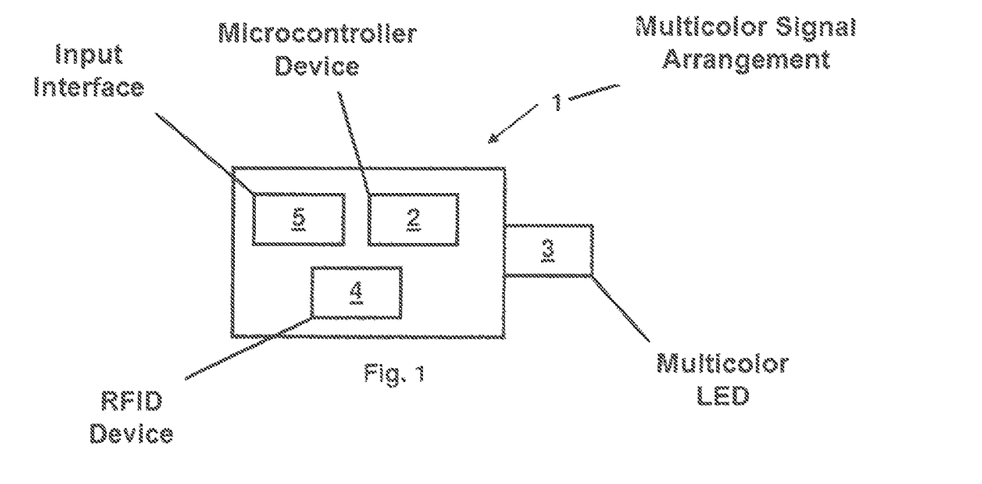
FIG. 1 shows a block diagram of a multicolor signal arrangement according to an embodiment.

FIG. 1 shows a multicolor signal arrangement 1 according to an embodiment of the present invention. The multicolor signal arrangement 1 comprises a microcontroller device 2, a multicolor LED 3 (for example an RGB LED), an RFID device 4 and an input interface 5.

A multicolor signal arrangement 1 of this type can for example be used as an operation and diagnosis system for smart switchgear. For example, information can thus be displayed to the operator and/or the maintenance worker by the switchgear. The multicolor signal arrangement is designed such that it can display various color and blinking patterns, for example. In this way, for example, various machine states or changes to machine states can be displayed.

The multicolor signal arrangement 1 is designed such that the input interface 5 receives pulse-width-modulated control signals. Control signals of this type can for example be sent by a PLC system. The input interface 5 can for example be activated by a 24 VDC control output. Advantageously, there is no need for a field bus interface or data interface as a result. Therefore, the multicolor signal arrangement 1 can be connected to any control system. At a fundamental frequency of e.g. 1 Hz and a pulse/pause ratio of 100 ms, eleven different control signals can be transmitted in this example. Eleven operating modes can be assigned to these eleven control signals. One of these operating modes can be an off mode so that the multicolor signal arrangement 1 or the multicolor LED 3 can be completely switched off. The other ten control signals can be assigned to ten different operating modes.

The RFID device 4 can for example be in the form of a microchip. Furthermore, the RFID device 4 can be connected to the microcontroller device 2 by means of an I2C (Inter-Integrated circuit) interface, for example. The RFID device 4 receives operating mode parameter signals. The operating mode parameter signals can be sent to the RFID device 4 by, for example, an RFID recorder and/or by a smartphone having an RFID recorder function. The operating mode parameter signals can be sent to the RFID device 4 immediately after the multicolor signal arrangement 1 has been manufactured and also not until later when the user is in possession of the multicolor signal arrangement 1. The operating mode parameter signals can be sent to the RFID device 4 not just once, but in fact multiple times. As a result, the operating modes can be modified at will.

Figure 2:
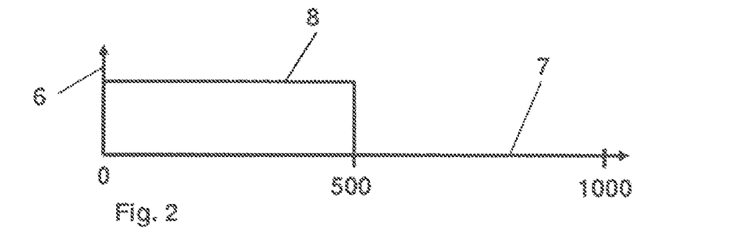
FIG. 2 shows a control signal for a multicolor signal arrangement according to an embodiment of the present invention.

FIG. 2 schematically shows a pulse-width-modulated control signal for a multicolor signal arrangement 1 according to another embodiment. The time in milliseconds (ms) is plotted on the horizontal axis 7. In this example, the voltage (V) is plotted on the vertical axis 6. This control signal is based on a fundamental frequency of 1 Hz with a pulse/pause ratio of 100 ms. In this control signal, a constant voltage having the amplitude 8 is transmitted for 500 ms.

Figure 3:
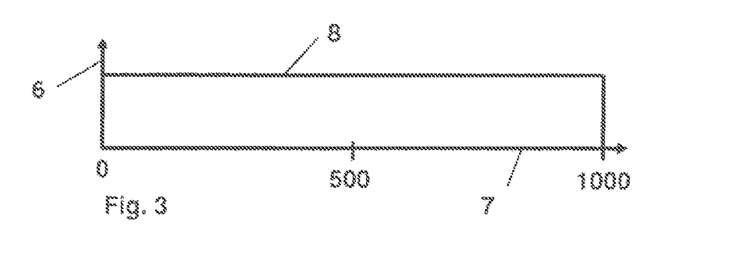
FIG. 3 shows a control signal for a multicolor signal arrangement according to an embodiment of the present invention.

FIG. 3 schematically shows another pulse-width-modulated control signal for the multicolor signal arrangement 1. This control signal too is based on a fundamental frequency of 1 Hz with a pulse/pause ratio of 100 ms. In this control signal, a constant voltage having the amplitude 8 is transmitted for 1000 ms.

In the following, an example shall be given as to what the control signals may be like for the multicolor signal arrangement 1. The maximum signal length in this example is 1000 ms. This maximum signal length is divided into ten parts, and so each individual signal has a signal length that is a multiple of 100 ms. Ten signals thus fit into the maximum signal length 1000 ms. These are joined by the off signal, in which no signal level is transmitted. There are thus eleven control signals in this example. The control signals are numbered continuously from 0 to 10.

The following table contains the control signal number in the first column on the left. The second column contains the negative or lower limit value of the signal length for each signal, the third column contains the average value of the signal length for each signal, and the fourth column contains the positive or upper limit value of the signal length for each signal.

TABLE 1

| Control signals | | | |
|---|---|---|---|
| Control signal no. | Signal length lower limit value [ms] | Signal length average value [ms] | Signal length Upper limit value [ms] |
| 0 | 0 | 0 | 0 |
| 1 | 51 | 100 | 150 |
| 2 | 151 | 200 | 250 |
| 3 | 251 | 300 | 350 |
| 4 | 351 | 400 | 450 |
| 5 | 451 | 500 | 550 |
| 6 | 551 | 600 | 650 |
| 7 | 651 | 700 | 750 |
| 8 | 751 | 800 | 850 |
| 9 | 851 | 900 | 950 |
| 10 | 951 | 1000 | 1050 |

The control signal 0 corresponds to the off signal. The voltage 0 is transmitted with control signal 0. The multicolor LED 3 is switched off with this control signal 0. Control signal 1 has an average value of 100 ms. Furthermore, control signal 1 has a lower limit value of 51 ms and an upper limit value of 150 ms. A tolerance range is defined by the lower limit value and the upper limit value. This is particularly advantageous for PLC systems, which have a typical cycle time of from 10 to 20 ms. Cycle time means that the control output of the PLC system cannot be set to be faster than a time of 20 ms. Furthermore, fluctuations or jitters in the signal length can be taken into account by said tolerance range. Accordingly, the input interface is configured such that, for example, a received control signal of signal length 430 ms is recognized as control signal no. 4. This is because 430 ms is below the upper limit value of control signal no. 4 and is therefore assigned to control signal no. 4 by the input interface.

In the following, light patterns are disclosed which can be sent to the RFID device 4 by an RFID transmission device within the operating mode definition information.

Figure 4:
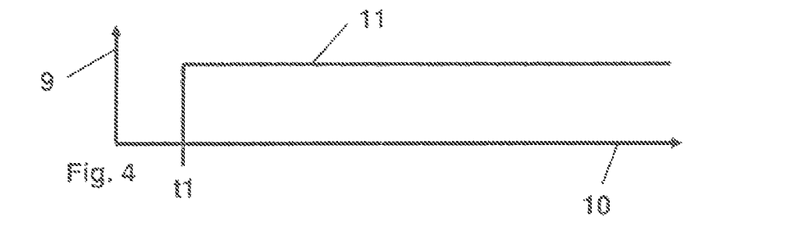
FIG. 4-14 show example light patterns.

FIG. 4 shows an example light pattern. This light pattern is also referred to hereinafter as continuous light. A light pattern of this type or light pattern information including such a light pattern can be sent to the RFID device 4 by an RFID recorder within the operating mode definition information. The light pattern information is transmitted to the microcontroller device 2. The operating modes can now be defined such that one or more operating modes can be carried out with this light pattern. In addition, color information can also be sent to the RFID device 4 by the RFID recorder, again within the operating mode definition information. The color information is likewise transmitted to the microcontroller device 2. The operating modes can now be defined such that one or more operating modes are carried out with the corresponding color.

By way of example, the brightness or the intensity at the amplitude 11 of the multicolor signal arrangement 1 or the multicolor LED 3 is plotted on the vertical axis 9. The time in milliseconds is plotted on the horizontal axis 10. This light pattern is continuous light, which is switched on at a time t1.

If, for example, an operating mode is to be defined such that the operating mode corresponds to a continuous red light, light pattern information corresponding to the light pattern from FIG. 4 and color information corresponding to the color red are sent to the RFID device 4 by the RFID recorder within the operating mode definition information.

After, the operating mode is defined by the microcontroller device 2 such that the operating mode is carried out with the light pattern from FIG. 4 and the color red.

Figure 5:
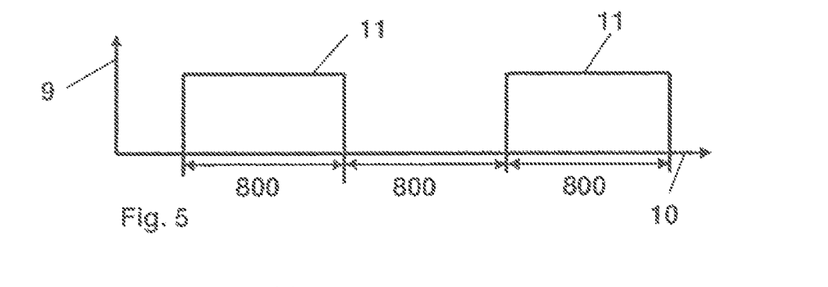

FIG. 5 illustrates another example light pattern. This light pattern is also referred to hereinafter as blinking mode 1. In this light pattern, the multicolor LED 3 illuminates with constant brightness or intensity for 800 ms. Then, the multicolor LED 3 is switched off and remains switched off for 800 ms. The multicolor LED 3 is then switched back on again and illuminates for another 800 ms. Afterwards, the multicolor LED 3 is switched off again and remains switched off for 800 ms. This light pattern corresponds to a blinking light with an illumination time of 800 ms and a pause time of 800 ms. Otherwise, reference is made to the embodiments in relation to FIG. 4.

Figure 6:
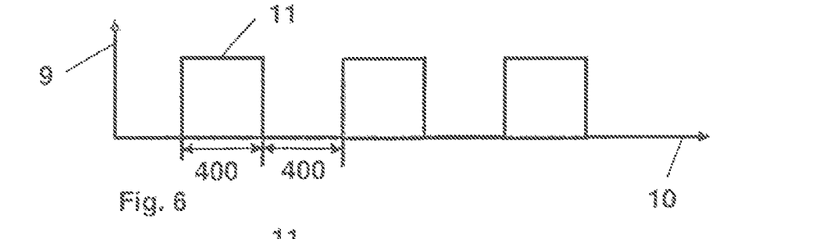

FIG. 6 illustrates another example light pattern. This light pattern is also referred to hereinafter as blinking mode 2. In this light pattern, the multicolor LED 3 illuminates with constant brightness or intensity for 400 ms. Then, the multicolor LED 3 is switched off and remains switched off for 400 ms. The multicolor LED 3 is then switched back on again and illuminates for another 400 ms. Afterwards, the multicolor LED 3 is switched off again and remains switched off for 400 ms. This light pattern corresponds to a blinking light with an illumination time of 400 ms and a pause time of 400 ms. Otherwise, reference is made to the embodiments in relation to FIG. 4.

Figure 7:
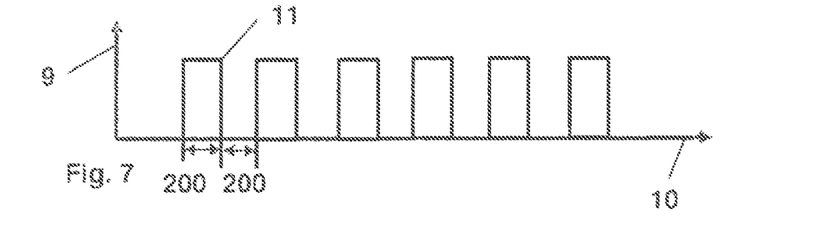

FIG. 7 illustrates another example light pattern. This light pattern is also referred to hereinafter as blinking mode 3. In this light pattern, the multicolor LED 3 illuminates with constant brightness or intensity for 200 ms. Then, the multicolor LED 3 is switched off and remains switched off for 200 ms. The multicolor LED 3 is then switched back on again and illuminates for another 200 ms. Afterwards, the multicolor LED 3 is switched off again and remains switched off for 200 ms. This light pattern corresponds to a blinking light with an illumination time of 200 ms and a pause time of 200 ms. Otherwise, reference is made to the embodiments in relation to FIG. 4.

Figure 8:
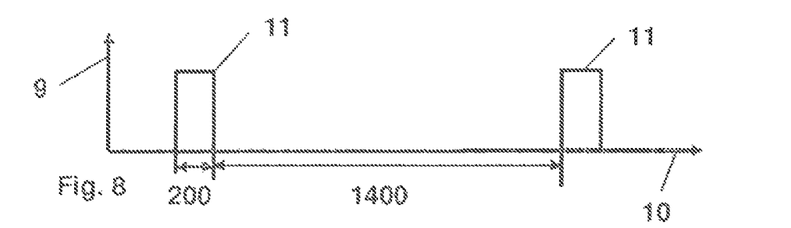

FIG. 8 illustrates another example light pattern. This light pattern is also referred to hereinafter as pulsed mode 1. In this light pattern, the multicolor LED 3 illuminates for 200 ms. Next, the multicolor LED 3 is switched off and remains switched off for 1400 ms. Then, the multicolor LED 3 is switched on and illuminates for 200 ms. Next, the multicolor LED 3 is switched off and remains switched off for 1400 ms. This light pattern corresponds to a pulsed mode with a pulse length or pulse duration of 200 ms. Otherwise, reference is made to the embodiments in relation to FIG. 4.

Figure 9:
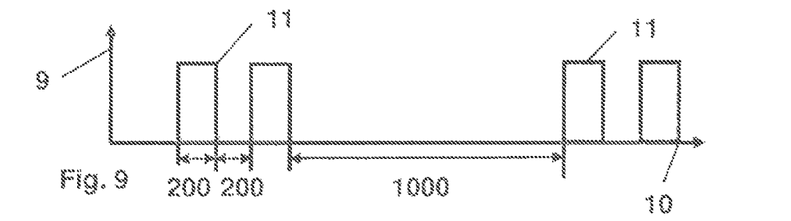

FIG. 9 illustrates another example light pattern. This light pattern is also referred to hereinafter as pulsed mode 2. In this light pattern, the multicolor LED 3 illuminates for 200 ms. Next, the multicolor LED 3 is switched off and remains switched off for 200 ms. Then, the multicolor LED 3 is switched on and illuminates for 200 ms. Next, the multicolor LED 3 is switched off and remains switched off for 1000 ms. This pattern is then repeated. This light pattern corresponds to a pulsed mode having two pulses having a pulse length or pulse duration of 200 ms and a 200 ms pause between the pulses. Otherwise, reference is made to the embodiments in relation to FIG. 4.

Figure 10:
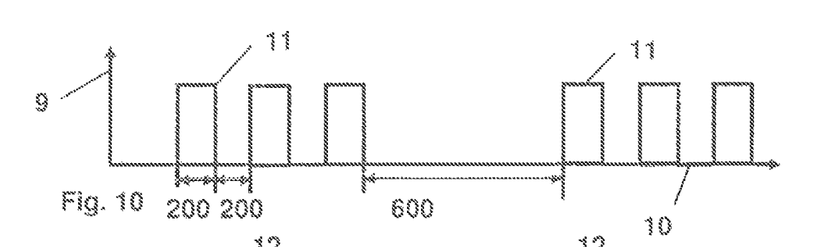

FIG. 10 illustrates another example light pattern. This light pattern is also referred to hereinafter as pulsed mode 3. In this light pattern, the multicolor LED 3 illuminates for 200 ms. Next, the multicolor LED 3 is switched off and remains switched off for 200 ms. Then, the multicolor LED 3 is switched on and illuminates for 200 ms. Next, the multicolor LED 3 is switched off and remains switched off for 200 ms. Then, the multicolor LED 3 is switched on and illuminates for 200 ms. Next, the multicolor LED 3 is switched off and remains switched off for 600 ms. This pattern is then repeated. This light pattern corresponds to a pulsed mode having three pulses having a pulse length or pulse duration of 200 ms and a 200 ms pause between the pulses. Otherwise, reference is made to the embodiments in relation to FIG. 4.

Figure 11:
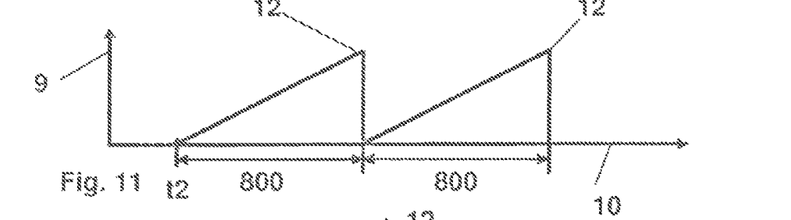

FIG. 11 illustrates another example light pattern. This light pattern is also referred to hereinafter as glow mode 1. From the time t2, the brightness or intensity of the multicolor LED 3 increases linearly from 0 to a maximum value 12 within 800 ms. After the maximum value 12 is reached, the multicolor LED 3 is switched off. Immediately thereafter, the brightness or intensity of the multicolor LED 3 increases linearly again from 0 to the maximum value 12 within 800 ms. This pattern is then repeated. Otherwise, reference is made to the embodiments in relation to FIG. 4.

Figure 12:
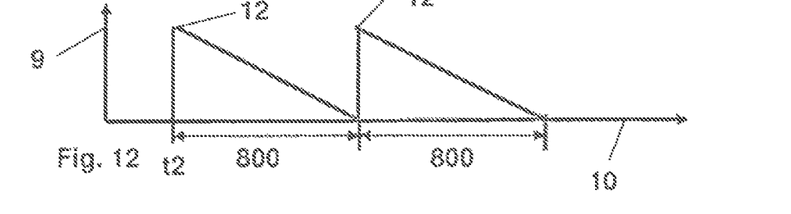

FIG. 12 illustrates another example light pattern. This light pattern is also referred to hereinafter as glow mode 2. From the time t2, the brightness or intensity of the multicolor LED 3 decreases linearly from the maximum value 12 to 0 within 800 ms. After reaching 0, the multicolor LED 3 is switched back to the maximum value 12. Immediately thereafter, the brightness or intensity of the multicolor LED 3 decreases again from the maximum value 12 to 0 within 800 ms. This pattern is then repeated. Otherwise, reference is made to the embodiments in relation to FIG. 4.

Figure 13:
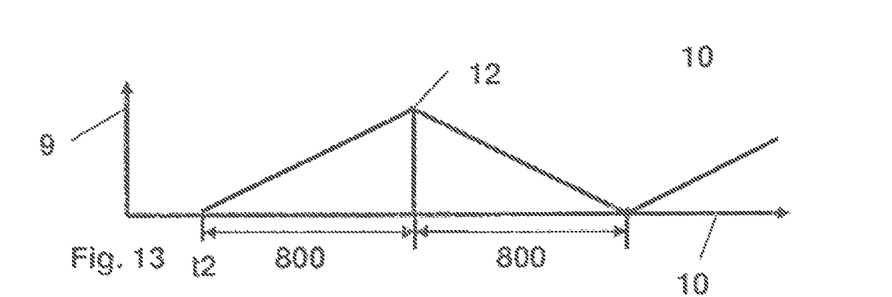

FIG. 13 schematically shows another example light pattern. This light pattern is also referred to hereinafter as glow mode 3. From the time t2, the brightness or intensity of the multicolor LED 3 increases linearly from 0 to the maximum value 12 within 800 ms. Once the maximum value 12 is reached, the brightness or intensity of the multicolor LED 3 decreases linearly from the maximum value 12 to 0 within 800 ms. This pattern is then repeated. Otherwise, reference is made to the embodiments in relation to FIG. 4.

Figure 14:
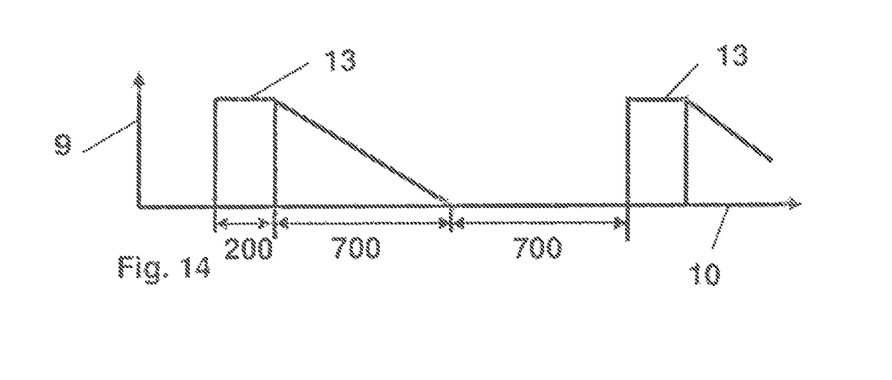

FIG. 14 schematically shows another example light pattern. This light pattern is also referred to hereinafter as special effect. First, the multicolor LED 3 illuminates for 200 ms at an amplitude 13. Afterwards, the brightness or intensity of the multicolor LED 3 decreases linearly to 0 within 700 ms. The multicolor LED 3 then remains switched off for 700 ms. This pattern is then repeated. Otherwise, reference is made to the embodiments in relation to FIG. 4. Furthermore, color information can additionally be provided. In this case for example, the multicolor LED 3 could illuminate white during the amplitude 13. Next, when the brightness or intensity decreases linearly, the multicolor LED 3 can for example illuminate in blue. Special effects can also be defined in this way. Special effects of this type can for example also already be stored in the microcontroller device 2. If the operating mode definition information contains special effect information in this case, the special effect information can be assigned to the stored special effect and the operating mode can be defined by this special effect.

By way of example, the following table shows an overview of the parameters or information that can be transmitted to the RFID device 4 by an RFID recorder within the operating mode definition information. The left-hand column shows the various colors, e.g. purple, blue, green, etc. The right-hand column contains the different light patterns that can be transmitted to the RFID device 4. In this example, the light patterns are the light patterns that have been defined or described in FIG. 4 to 14.

TABLE 2

| Color information and light pattern information | |
|---|---|
| Color information | Light pattern information |
| Purple | (ON) continuous light on |
| Blue | (OFF) continuous light off |
| Light blue | Blinking mode 1 |
| Green | Blinking mode 2 |
| Yellow | Blinking mode 3 |
| Orange | Pulsed mode 1 |
| Red | Pulsed mode 2 |
| | Pulsed mode 3 |
| | Glow mode 1 |

TABLE 2-continued

| Color information and light pattern information | |
|---|---|
| Color information | Light pattern information |
| | Glow mode 2 |
| | Glow mode 3 |

Alternatively or additionally, it is also possible to select special effects (also abbreviated to SE hereinafter) that are already stored in the multicolor signal arrangement 1 or in the microcontroller device 2. For this purpose, special effect information has to be transmitted to the RFID device 4 in the operating mode definition information. In this case, no color information and no light pattern information have to be transmitted to the RFID device 4, but rather only the special effect information has to be transmitted, because the associated special effect is already stored in the microcontroller device 2. On the basis of this special effect information, the microcontroller device 2 selects the associated stored special effect and assigns this special effect to the operating mode. In Table 3 below, four examples of special effects are given.

TABLE 3

| Special effects |
|---|
| Special effect |
| (SE1) Special effect with bright, short flashes and blue after the glowing |
| (SE2) Special effect with bright, short flashes and red after the glowing |
| (SE3) Special effect with bright, short flashes and green after the glowing |
| (SE4) Special effect with bright, short flashes and yellow after the glowing |

Table 4 below shows an overview of a defined set of operating modes. The left-hand column contains the control signal number. The second column from the left contains the operating mode number. The third column from the left shows the content of the color information or the special effect information that is transmitted to the RFID unit 4 within the operating mode definition information. In the last two rows, which relate to operating modes no. 9 and 10, the number of the corresponding special effect SE1 and SE2 that has been assigned to operating modes 9 and 10, respectively, is given instead of the color information. In this case, i.e. for operating modes 9 and 10, no color information and no light pattern information are transmitted since the corresponding special effects are already stored in the microcontroller device 2. For said operating modes 9 and 10, only the special effect information is transmitted. The right-hand column shows the light pattern information that is transmitted to the RFID device 4 within the operating mode definition information.

TABLE 4

| Example definitions of operating modes | | | |
|---|---|---|---|
| Control signal no. | Operating mode | Color information/special effect information | Light pattern information |
| 0 | LED off | — | — |
| 1 | 1 | Blue | Continuous light |
| 2 | 2 | Blue | Blinking mode 1 |
| 3 | 3 | Green | Continuous light |
| 4 | 4 | Green | Blinking mode 1 |
| 5 | 5 | Red | Glow mode 1 |
| 6 | 6 | Yellow | Continuous light |
| 7 | 7 | Yellow | Blinking mode 1 |
| 8 | 8 | Blue | Pulsed mode 1 |

TABLE 4-continued

| Example definitions of operating modes | | | |
|---|---|---|---|
| Control signal no. | Operating mode | Color information/special effect information | Light pattern information |
| 9 | 9 | Special effect SE1 | — |
| 10 | 10 | Special effect SE2 | — |

The first row shows the operating mode "off mode" or "LED off". This operating mode is assigned to control signal 0 or no. 0. This operating mode is also not assigned any color information or light pattern information. In the operating mode "LED off", the multicolor LED does not illuminate, but rather remains switched off.

To define the operating modes, the following information is transmitted to the RFID device 4 by the RFID recorder in this example. The number of the operating mode that is to be defined is transmitted within the operating mode definition information. Next, the color information and the light pattern information or the special effect information that are to be assigned to the operating mode to be defined are transmitted to the RFID device 4. To define operating mode 5 for example, operating mode 5 first has to be indicated as the operating mode to be defined within the operating mode definition information. Furthermore, the color information "red" and the light pattern information "glow mode 1" have to be transmitted. To define operating mode 10 for example, operating mode 10 first has to be indicated as the operating mode to be defined within the operating mode definition information. Furthermore, the special effect information having the content SE2 or special effect 2 has to be transmitted. The special effect 2 is stored in the microcontroller device 2 and the special effect 2 is assigned to operating mode 10 or operating mode 10 is defined by special effect 2.

After all the operating modes 1 to 10 have been defined by means of the RFID device 4, the operation in the multicolor signal arrangement 1 proceeds as follows. The multicolor signal arrangement 1 or the input interface 5 receives for example a pulse-width-modulated control signal, for example control signal 4 or no. 4, from smart switchgear. Operating mode 4 is assigned to control signal 4 in the microcontroller device 2. Operating mode 4 has been defined beforehand by means of the RFID device 4 using the color information "green" and the light pattern information "blinking mode 1". After control signal 4 is received, the microcontroller device 2 thus operates the multicolor LED 3 in operating mode 4, and so the multicolor LED 3 blinks green, the multicolor LED 3 illuminating in green for 800 ms, then being switched off for 800 ms, and illuminating in green again for 800 ms, etc.

It is also possible for the operating modes to be able to be defined multiple times, i.e. redefined or modified. If for example the multicolor LED 3 is no longer intended to blink green, but in fact is intended to blink red in operating mode 4, color information containing the content "red" can be sent for operating mode 4 within the operating mode definition information by means of the RFID device 4, and so the color of operating mode 4 can be changed.

The preceding examples are merely used to illustrate and explain the present invention. However, the examples do not limit the subject matter of the application in any way.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS

1 Multicolor signal arrangement
2 Microcontroller device
3 Multicolor LED
4 RFID device
5 Input interface
6, 7 Axis
8 Amplitude
9, 10 Axis
11, 13 Amplitude
12 Maximum value

The invention claimed is:

1. A multicolor signal arrangement, comprising:
a multicolor LED;
a microcontroller device; an input interface; and
a radio frequency identification device (RFID),
wherein the multicolor signal arrangement is configured such that the input interface receives one or more pulse-width-modulated control signals,
wherein the multicolor LED is operated in a first operating mode when the input interface receives a first control signal,
wherein the multicolor LED is operated in a second operating mode when the input interface receives a second control signal,
wherein the multicolor signal arrangement is configured such that the RFD device receives operating mode definition information,
wherein the operating mode definition information is transmitted to the microcontroller device, and
wherein the microcontroller device defines the operating modes based on the operating mode definition information.

2. The arrangement of claim 1, wherein the operating mode definition information includes color information.

3. The arrangement of claim 1, wherein the operating mode definition information includes light pattern information.

4. The arrangement of claim 1, configured such that at least one of predefined light patterns, colors, or special effects are stored in the microcontroller device,
wherein the operating mode definition information includes assignment information,
wherein the microcontroller device assigns a stored light pattern, a stored color, and/or a stored special effect to the assignment information, and
wherein the microcontroller device defines the operating mode by the assigned light pattern, the assigned color, and/or the assigned special effect.

5. The arrangement of claim 4, wherein the assignment information is assigned to at least one of the stored light pattern, the stored color, or the stored special effect using a look-up table.

6. The arrangement of claim 1, wherein the operating mode definition information includes a dataset,
wherein the dataset includes at least one of operating mode identification information, color information, light pattern information, or assignment information.

7. The arrangement of claim 1, wherein the RFID device includes a near field communication (NFC) device.

8. The arrangement of claim 1, wherein the operating modes can be at least one of defined or modified multiple times using the RFD device.

9. The arrangement of claim 1, configured such that the RFID device additionally receives control signal definition information,
wherein the RFID device sends the control signal definition information to the microcontroller device, and
wherein the control signals are defined and/or modified based on the control signal definition information.

10. The arrangement of claim 1, wherein the RFID device includes a microchip.

11. The arrangement of claim 1, wherein the RFID device and the microcontroller device are arranged on a common printed circuit board in a common housing.

12. A system, comprising:
the arrangement of claim 1; and
an RFD transmission device,
wherein the RFID transmission device is configured to send the operating mode definition information to the RFID device.

13. A method for defining operating modes of a multicolor signal arrangement including a multicolor LED, a microcontroller device, a radio frequency identification device (RFID), and an input interface, the method comprising:
receiving, by the input interface, one or more pulse-width-modulated control signals;
operating the multicolor LED in a first operating mode when the input interface receives a first control signal;
operating the multicolor LED in a second operating mode when the input interface receives a second control signal; and
receiving, by the RFID device, operating mode definition information, the operating mode definition information being transmitted to the microcontroller device and the microcontroller device defining the operating modes on the basis of the operating mode definition information.

* * * * *